United States Patent [19]

Kaminsky

[11] Patent Number: 4,514,116
[45] Date of Patent: Apr. 30, 1985

[54] DRIVE MECHANISM FOR RADIAL ADJUSTMENT OF A DRILLING TOOL

[75] Inventor: Theo Kaminsky, Pfungstadt, Fed. Rep. of Germany

[73] Assignee: Santrade Ltd., Lucerne, Switzerland

[21] Appl. No.: 406,230

[22] PCT Filed: Dec. 5, 1981

[86] PCT No.: PCT/DE81/00215
§ 371 Date: Aug. 6, 1982
§ 102(e) Date: Aug. 6, 1982

[87] PCT Pub. No.: WO82/02011
PCT Pub. Date: Jun. 24, 1982

[30] Foreign Application Priority Data

Dec. 8, 1980 [DE] Fed. Rep. of Germany ....... 3046210

[51] Int. Cl.³ .............................................. B23B 47/00
[52] U.S. Cl. ..................................... 408/161; 408/153
[58] Field of Search ............... 29/26 A, 26 R; 408/12, 408/147, 153, 161, 162, 158; 82/1.2, 1 E, 1 C, 1 R, 1.5

[56] References Cited

U.S. PATENT DOCUMENTS 2,734,402  2/1956  Hoern ................................. 82/1.5
3,286,556 11/1966  Reynolds ............................ 408/147
4,009,968  3/1977  Vandenkieboom ................... 408/12
4,067,251  1/1978  Eckle et al. ........................ 408/147

FOREIGN PATENT DOCUMENTS 2124657 12/1971  Fed. Rep. of Germany ..... 29/26 R
2731860 11/1978  Fed. Rep. of Germany ......... 82/1.2
2315349  1/1977  France .................................. 29/27
2327840  5/1977  France ............................. 29/26 R
 990967  5/1965  United Kingdom ............... 408/147
1323014  7/1973  United Kingdom ............... 29/26 A Primary Examiner—William R. Briggs
Attorney, Agent, or Firm—Burns, Doane, Swecker & Mathis

[57] ABSTRACT

The output shaft of a rotary drive motor is connected to a screw shaft which is disposed on the same axis as the output shaft. The screw shaft is rotatably mounted in an axial bearing in a housing, and engages an internal screw element (nut) fixed to a thrust body which is axially displaceable in the housing. A drive rod is rotatably mounted in the thrust body. In order to reduce the longitudinal dimension of the device, the free end of the screw shaft extends into a bore hole in the end of the drive rod, which rod serves to axially displace a thrust bar for adjusting a drilling tool in a drill head.

1 Claim, 1 Drawing Figure

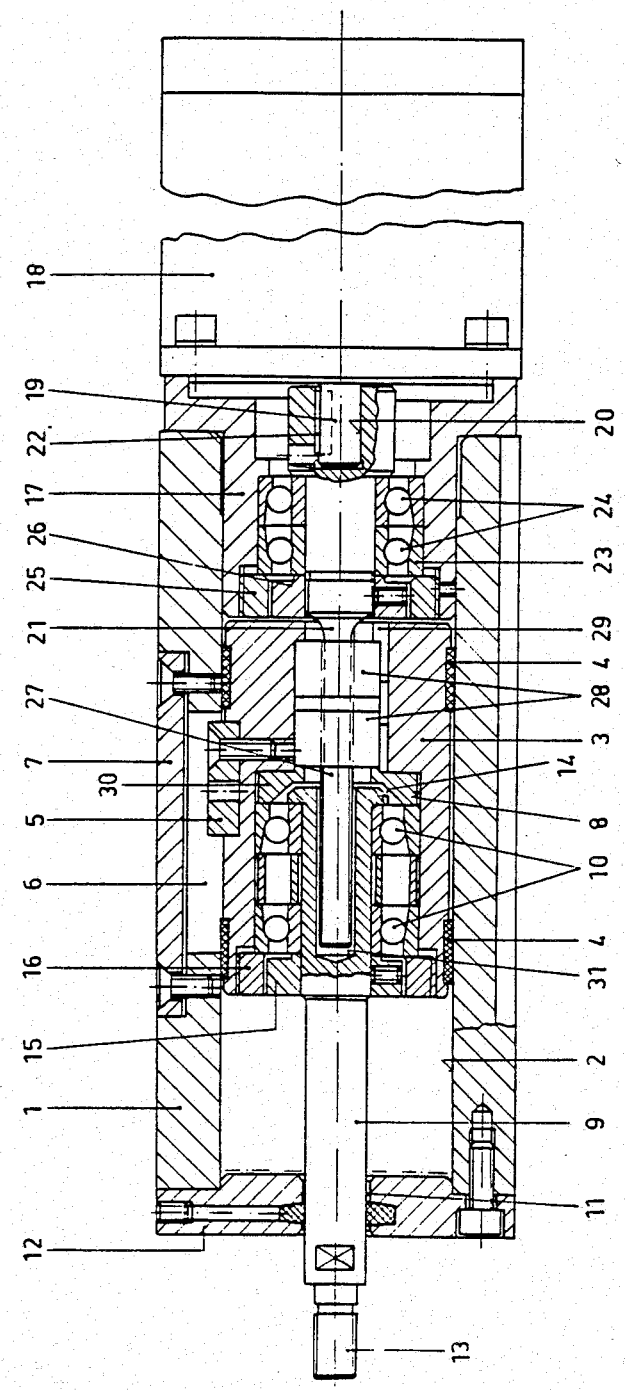

DRIVE MECHANISM FOR RADIAL ADJUSTMENT OF A DRILLING TOOL

BACKGROUND AND SUMMARY OF THE PRESENT INVENTION

The invention relates to a drive mechanism for radial adjustment of a drilling tool in a drill head by means of an axially moveable drive rod which is connected to a rotary drive motor via a screw drive mechanism.

The radial adjustment of a drilling tool in a drill head has the purpose of separating the drilling tool from the surface being cut, at the conclusion of a drilling operation, in such a way that no scores or grooves are left [i.e., produced] in said surface. The mechanism also serves to produce a radial adjustment of the drilling tool to compensate for cutting wear occurring on the tool. This compensation enables the operating life of a drilling tool to be greatly extended, because in general the limiting condition in tool life is the point where, due to cutting wear, the dimensions of the surface being cut are no longer within the acceptable range.

Most types of mechanism for radial adjustment of a drilling tool in a drill head have the feature that a drive rod, which is centrally disposed in the drill head and extends through the tool spindle holding which spindle holds the drill head, acts directly or indirectly on the drilling tool via an inclined surface, whereby the tool is radially adjusted. The drive rod rotates with the drill head and the tool spindle. The drive rod is driven axially by a rotary drive motor via a screw drive which converts the rotational movement produced by the motor to an axial thrust movement.

In a known drive mechanism of the type initially described above (Ger. Auslegeschrift 21 67 082), the rotary drive motor is connected to the screw shaft via a rotating coupling which permits longitudinal movement. The internal screw which engages the screw shaft is fixed to the mounting. The end of the screw shaft which is distant from the rotary drive motor is connected to the drive rod via a thrust bearing.

There are embodiments of the type of drive mechanism described initially above in which the rotary drive motor is not aligned with the longitudinal axis of the screw shaft but with an axis intersecting the longitudinal axis (U.S. Pat No. 3,286,556) or with an axis parallel to the longitudinal axis (Fr. Pat. No. 2,327,840). In contrast to these, the known device of Ger. AS 21 67 082 (cited supra) has relatively small lateral dimensions (diameter); however, the axial length is relatively large. A significant factor in this is the fact that the achievable axial thrust movement is reflected twofold in the axial length of the drive mechanism—first in the rotating coupling, in which allowances must be made for this axial movement, and secondly in the length of the screw shaft which extends beyond the internal screw, which length also must equal the achievable axial movement. Further, there is a degradation of the adjustment accuracy of the known drive mechanism due to the fact that there is play in the required rotating coupling, at least when unavoidable wear develops.

An object of the invention is thus to devise a drive mechanism of the type described initially above, such that the mechanism has same-axis construction, and thereby small lateral dimensions, but is also as short as possible in its axial dimension, and further is comprised of types of elements which in combination result in very high tool adjustment accuracy.

This object and others are achieved according to the invention in that a screw shaft which is connected to and disposed on the same axis as the output shaft of the rotary drive motor is rotatably mounted in an axial bearing in a housing, and engages an internal screw element. The internal screw element is fixed to a thrust body which is axially displaceable in the housing. A rotatable drive rod which can be connected to the thrust bar in the tool is rotatably mounted in an axial bearing in the thrust body. The free end of the screw shaft extends into a bore hole in the end of the drive rod.

The types of working elements used, namely axial bearings and a screw drive, make possible an embodiment of the drive mechanism with very high adjustment accuracy. The axial dimension is relatively short, due to the fact that the necessary axial adjustment distance is reflected only once in the axial dimension of the drive mechanism, namely at the location where it is necessary to provide room for the axial movement of the thrust body. Although the part of the screw shaft which projects from the internal screw must also be at least as long as the prescribed displacement distance for effecting the adjustment, in the inventive mechanism it does not add to the overall axial dimension of the drive mechanism because the free end of the screw shaft extends into the bore hole in the end of the drive rod.

In a particularly advantageous embodiment of the invention the axial bearing of the drive rod is disposed axially adjacent to the internal screw element and surrounds the end of the drive rod. In this way the axial segment of the mechanism in which the free end of the screw shaft extends into the bore hole of the drive rod is also simultaneously employed to accommodate the the axial bearing for the drive rod, so that no additional axial space is taken up in mounting this axial bearing. The sole condition which determines the length of the thrust body is the need to dispose the internal screw element and the axial bearing for the drive rod axially adjacent to each other.

A particularly advantageous embodiment of the invention from the manufacturing engineering standpoint is characterized in that the thrust body is axially displaceably guided in a bore in the housing. The axial bearing of the screw shaft is mounted in an insert which is held in the bore in the housing. Under this arrangement the housing comprises essentially a cylinder with a longitudinal bore, which can be manufactured with very high precision. The thrust body is guided in the longitudinal bore, and also the axial bearing of the screw shaft is held in an insert which is mounted in the bore. Thus in addition the arrangement greatly simplifies the assembly of the drive mechanism.

BRIEF DESCRIPTION OF THE DRAWINGS

The invention will be described in more detail hereinafter, with the aid of an exemplary embodiment which is illustrated in the drawing.

DETAILED DESCRIPTION OF THE PREFERRED EMBODIMENTS

The drawing is a longitudinal cross section of a drive mechanism for radial adjustment of a drilling tool in a drill head (not shown). A thrust body 3, having sliding bushings or sleeve bearings 4 on both ends, is axially displaceably housed in a housing 1 which has a cylindrical longitudinal bore 2. An adjusting spring 5 which is screwed onto the thrust body 3 is guided in a longitudinal slot 6 in housing 1, which slot is closed externally by a cover 7.

A drive rod 9 is rotatably mounted in an axial bearing in a recessed bore hole 8 in the thrust body 3, which axial bearing comprises two axially braced ball or roller bearings 10.

The drive rod 9 extends through a hole 11 in an end plate 12 which is screwed onto housing 1. On the outer end of rod 9 there is a threaded extension 13 by which it can be attached to an axially displaceable thrust bar on the drill head. Drive rod 9 has a flange 14 at its other end, against which the inner race of one of the axial bearings 10 lies. The inner race of the other axial bearing 10 is held by a nut 15 screwed onto the drive rod 9. A ring nut 16 screwed into the bore hole 8 braces the outer races of bearings 10 against each other without any play.

On the end of the housing 1 which is distant from drive rod 9 a recessed insert 17 is mounted in the longitudinal bore 2. Rotary drive motor 18, which may be a stepping motor, for example, is screwed onto this insert. The output shaft 19 of the motor 18 engages a blind hole 20 at the end of a screw shaft 21. An adjusting spring 22 effects torque transmission from the output shaft 19 to the screw shaft 21.

An axial bearing comprising two ball or roller bearings 24 is mounted by a ring nut 25 in a bore hole 23 of insert 17. A nut 26 holds the bearings 24 on the screw shaft 21. A screw segment 27 of screw shaft 21 extends through an internal screw element 28 which is fixed in the thrust body 3 between a flange 29 on the end of thrust body 3 which and faces the motor and a ring insert 30, which ring insert is held in bore hole 8 by the force of the outer race of the axial bearing 10.

The free end of the screw segment 27 of the screw shaft 21 extends into a bore hole 31 in the end of drive rod 9 which faces the motor.

As may be seen from the drawing, the motor 18, screw shaft 21, and drive rod 9 are disposed along the same axis.

The internal screw element 28 engaged by the screw segment 27 of screw shaft 21 may comprise, e.g., two nuts which are axially braced against each other in order to eliminate play. The screw shaft 21 and associated internal screw element 28 may alternatively be in the form of a recirculating ball bearing screw and nut or (as in the embodiment illustrated) a planetary worm and screw-roller mechanism. In the latter mechanism there is a plurality of screw rollers mounted planetarily around the screw segment 27 of screw shaft 21, which screw rollers simultaneously engage the screw segment 27 of screw shaft 21 and an internal screw of internal screw element 28.

When the motor 18 drives the screw 21 in a rotational motion, the internal screw element 28 and with it also the thrust body 3 and the drive rod 9 are displaced axially outward (to the left in the drawing), until the end face of the thrust body 3 reaches the position of the cover 12 which position is indicated by the dot-dashed line. In the process the thrust body 3 is guided axially in the housing 1 without rotation. Drive rod 9, which is rotatably mounted in the thrust body 3, is rotated with the tool spindle which bears the drill head.

The bearing in the motor 18 may be used as the axial bearing for the screw shaft 21, as an alternative instead of the separate axial bearing 24. This results in further shortening of the drive mechanism.

The principles, preferred embodiments and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. In a drive mechanism for effecting radial adjustment of a drilling tool in a drill head, said drive mechanism comprising a housing, a thrust body mounted in said housing for axial sliding movement therein, a first axial bearing carried by said thrust body, a rotatable drive rod rotatably mounted in said first axial bearing for rotation about a longitudinal axis, said drive rod being movable along said longitudinal axis along with said thrust body between longitudinally inner and outer positions for radially adjusting a drilling tool, a second axial bearing disposed in said housing, a screw shaft mounted in said second bearing for rotation about said longitudinal axis, means preventing longitudinal movement of said screw shaft, said screw shaft including an externally threaded extension extending along said longitudinal axis toward said drive rod, an internally threaded element carried by said thrust body and being non-rotatable relative thereto, said threaded element being threadedly mounted on said threaded extension, a drive motor operably connected to said screw shaft to rotate the latter about said longitudinal axis for producing longitudinal movement of said threaded element along said extension to longitudinally move said drive rod, the improvement wherein an end of said drive rod facing said screw shaft has an outer diameter larger than that of said extension and includes a bore disposed in said end, said bore extending along said longitudinal axis in alignment with said extension to telescopingly receive said extension when said drive rod is in its longitudinally inner position.

* * * * *